United States Patent [19]
Armbruster et al.

[11] 3,972,138
[45] Aug. 3, 1976

[54] CREDIT CARD

[76] Inventors: Thomas L. Armbruster, 206 Ridgeway Drive, Norfolk, Nebr. 68701; Willliam N. Hill, 12411 Bel Drive, Omaha, Nebr. 58144

[22] Filed: Sept. 30, 1974

[21] Appl. No.: 510,283

[52] U.S. Cl. ................................................ 40/2.2
[51] Int. Cl.² .......................................... G09F 3/02
[58] Field of Search ....................... 283/7; 40/2.2; 235/61.7 B, 61.12 N, 61.12 M, 61.12 R

[56] References Cited
UNITED STATES PATENTS

| | | | |
|---|---|---|---|
| 3,245,697 | 4/1966 | Nugent | 283/7 |
| 3,399,473 | 9/1968 | Jaffe | 40/2.2 |
| 3,593,292 | 7/1971 | Scott | 40/2.2 |
| 3,676,644 | 7/1972 | Vaccaro | 101/369 X |
| 3,713,235 | 1/1973 | Roberts | 40/2.2 |
| 3,790,754 | 2/1974 | Black | 235/61.12 M |
| 3,821,060 | 6/1974 | Braca | 40/2.2 |
| 3,823,308 | 7/1974 | Goldberg | 235/61 |

*Primary Examiner*—Louis G. Mancene
*Assistant Examiner*—Wenceslao J. Contreras
*Attorney, Agent, or Firm*—Allegretti, Newitt, Witcoff & McAndrews

[57] ABSTRACT

An improved credit card construction includes visible information embossed thereon as well as the improvement of a slot having at least one magnetizable signal carrying tab movable to a desired index position. The credit card user places the tab in the correct index position to identify the user of the card as the proper user. When the card is not in use, the indexing tab is maintained in some other position in the indexing slot. The construction eliminates misuse of the credit card since only the proper owner knows the appropriate indexing tab position.

8 Claims, 4 Drawing Figures

3,972,138

CREDIT CARD

BACKGROUND OF THE INVENTION

This invention relates to an improved credit card construction and, more particularly, to a credit card construction which includes a mechanism that eliminates unauthorized use of the credit card.

In U.S. Pat. No. 3,762,081 issued Oct. 2, 1973, to Armbruster et al. for a Credit Card, there is disclosed a credit card construction which utilizes slots and mechanically movable members or tabs positioned in said slots. The members are movable to any one of a plurality of defined, index positions. In order to use the credit card, the movable members must be set in appropriate positions. The card is then "read" by identification apparatus such as a cash register computer billing terminal. When not in use the tabs are displaced from the correct "combination" positions.

The prior art credit card construction described, while providing a good means to prevent unauthorized use of a credit card, has the disadvantage of not being compatible with many credit card systems. Moreover, a complex combination of numbers may necessarily need to be committed to memory. This would be a burdensome task for the credit card user in the event he owns a number of such cards. The present invention contemplates an improvement over the prior art structure utilizing some of the basic principles associated with the prior art structure.

SUMMARY OF THE INVENTION

The present invention contemplates utilization of a standard credit card format, with embossed information on the face of the card and, optionally, a magnetic tape attached to the card, including the improvement of a slot with a magnetic indexing member or tab in said slot and positionable at any one of a number of index positions. Various combinations of slots and indexing members are disclosed.

It is thus an object of the present invention to provide an improved credit card construction.

It is a further object of the present invention to provide a credit card construction incorporating features of many presently available credit cards and also providing the additional feature of a construction that prevents unauthorized use of the credit card.

It is another object of the present invention to provide a credit card structure having an index member associated with a slot therein. The index member is settable to any one of a number of index positions, one index position serving to identify the correct user of the credit card.

Still another object of the present invention is to provide a credit card construction having a movable magnetic index member which may be moved to provide an identification signal for the user of the credit card.

Another object of the present invention is to provide an improved credit card construction having an index member translatable in a slot of that credit card or rotatable in said credit card to provide a required identification indexing signal.

These and other objects, advantages and features of the invention will be set forth in greater detail in the description which follows.

BRIEF DESCRIPTION OF THE DRAWING

In the detailed description which follows, reference will be made to the drawing comprised of the following figures.

DESCRIPTION OF THE PREFERRED EMBODIMENT

An embodiment of the improved credit card of the present invention is illustrated in the figures. The invention contemplates various permutations and selections of components illustrated in the embodiment depicted in the figures depending upon the specific requirements of the business which issues the credit card. Thus, the following description will discuss all of the possible features as incorporated in the illustrated credit card. However, it is to be understood that various features may be eliminated or altered as described in order to achieve additional desired functions with the credit card or eliminate various functions thereof. To the degree possible, all of these alternatives will be explained.

The credit card 10 is fabricated in the usual manner from a laminated plastic material. Information included on the credit card 10 would include that normally recorded on presently utilized credit cards. For example, a credit card number 12 associated with the account would be included and defined by embossed indices arranged in a series according to the requirements of the business which issued the credit card. Additionally, the name 14 of the credit card holder would be provided, for example, by embossed letters. Additional information 15 such as the address of the credit card holder or the expiration date could be included.

Figure 1:
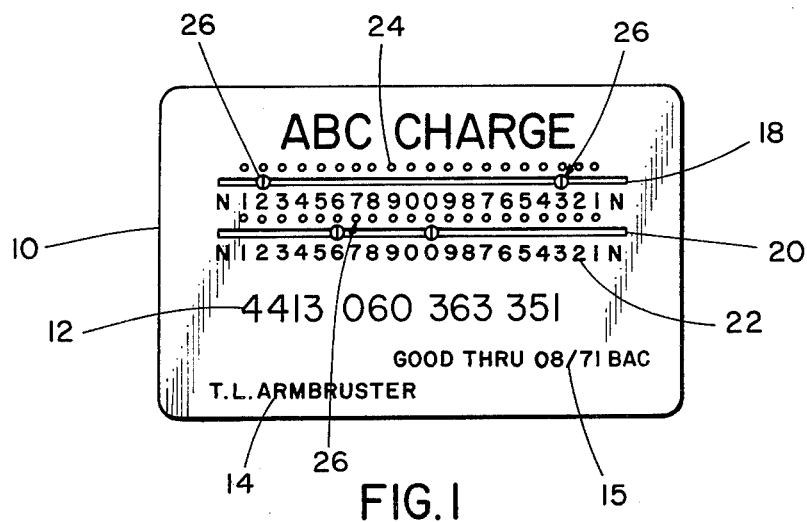
FIG. 1 is a front plan view of a typical credit card construction utilizing the improvement of the present invention.
Figure 2:
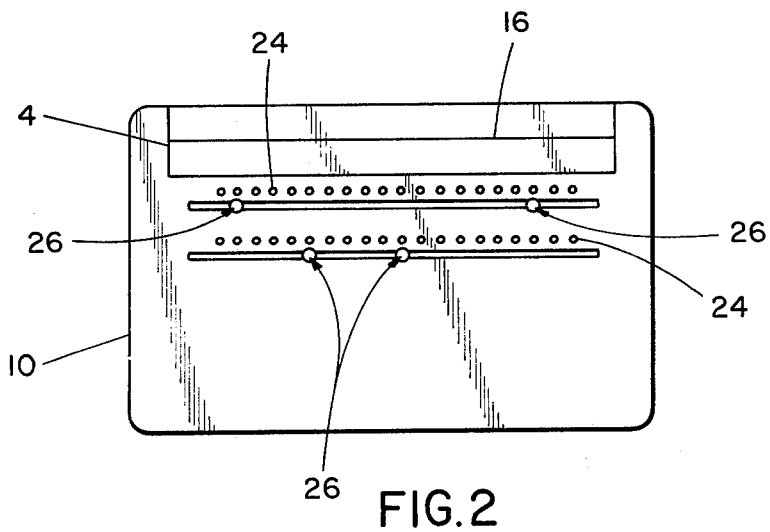
FIG. 2 is a back plan view of the credit card construction of the present invention as illustrated in FIG. 1.

As shown in FIG. 2, the back panel of the credit card optionally includes a strip of magnetic tape 16 attached thereto. One or more of these strips may be utilized on the credit card 10 for identification purposes.

The description has so far been directed toward a credit card construction as known in the prior art. The improvement of the present invention includes slots 18 and 20 in the credit card 10. In the embodiment disclosed, the slots 18 and 20 extend substantially along the length of one side of the credit card. These slots 18 and 20 are provided with visible indicia or indicators as at 22 spaced uniformly and serially along one or both edges. Any desired combination of indicators or indicia 22 may be utilized for this purpose.

Optionally, openings 24 are provided through the credit card 10 adjacent each indicia 22. These openings 24 are for the purpose of optical reading of the credit card. This will be discussed in greater detail below.

Figure 3:
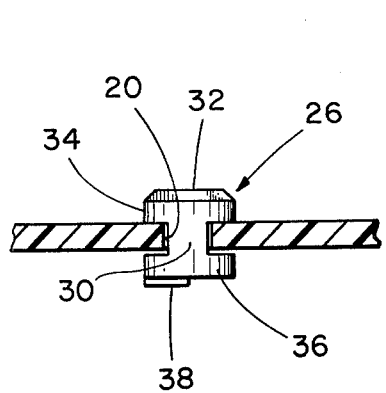
FIG. 3 is a cross-sectional view of the credit card construction of the present invention taken along the line 3—3 in FIG. 1.
Figure 4:
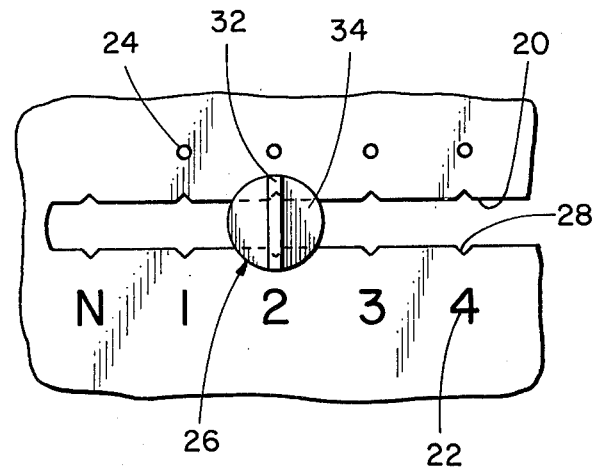
FIG. 4 is an enlarged front plan view of the indexing member and indexing slot of the improved credit card construction of the present invention.

Positioned in slots 18 and 20 are one or more indexing members or tabs 26. The tabs 26 are slidable in the slots 18 and 20 and may be indexed at any desired position adjacent one of the indicia 22. As shown in FIG. 4, slot 18 may include indexing indentations 28 adjacent the indicia 22. The indentations 28 cooperate with a connecting link 30 in FIG. 3 of the tab 26.

Link 30 may include flats on its slot engaging sides to prevent rotation of the tab 26. Alternatively, the tab 26 may be rotatable in order to adjust that tab 26 to a desired precise orientation. A tab handle member 32 extends from a top flange 34 of the tab 26 for purposes of movement and reorientation of the tab 26. That is, handle member 32 may be grasped to slide the tab 26 or to rotate the tab 26 depending upon the configuration of the link 30.

The top flange 34 maintains the tab 26 in fixed relation in the slot 18 preventing withdrawal of the tab from the slot. Top flange 34 thus acts in cooperation with bottom flange 36 to prevent removal of the tab 26 from the slot 18.

Magnetic tape material 38 in the nature of a permanent magnet as known to those in the art is provided on the bottom surface of flange 36. Alternatively, bottom flange 36 may, itself, be constructed of a magnetic material to provide a magnetic signal indicating that the tab 26 is positioned adjacent a particular indicia 22 in a slot 18, 20. It is possible to have the entire bottom flange 36 or a portion thereof fabricated from magnetic material or coated with a tape material 38. In FIG. 3, only a portion of the flange 36 is covered with tape material to provide a magnetic signal. The opposite or uncovered portion of the flange 36 does not provide any particular signal, but acts as a neutral portion of the tab 32.

The top flange 34 of the tab 26 and, in particular, the top surface thereof may be color coded. Thus, a different color may be provided on opposite sides of the handle member 32. This serves as an additional means for increasing combinations of settings of indicia for tabs 26 in the slots 18 and 20.

The credit card structure of the present invention can be utilized in a number of ways in combination with various types of credit check equipment. That is, in the past, printed listings have been utilized to verify that a credit card was not reported as stolen or missing. With the structure of the present invention, the credit card number 12 serves to imprint a receipt. Additionally, the credit card user would establish his authenticity or authority by positioning tabs 26 appropriately in the slots 18 and 20.

Thus, one or more tabs would be positioned opposite an appropriate indicia 22 known only to the true credit card owner and user. This indicia need only be a single number and, thus, would involve a single tab associated with a single slot. It would be quite easy for the true credit card owner to remember the particular indicia to which the tab 26 should be set. The necessity of remembering a complex combination of indicia would not be necessary.

Since the tab 26 includes magnetic material 38, a signal source is associated with the adjacent indicia 22. The position of tab 26 would be sensed by appropriate sensing equipment such as a pair of coils between which the magnetic material is passed. The signal derived from the position of the tab 26 in the slot 18 could then be identified as that associated with the correct credit card owner so long as the tab is in the "right" position.

Magnetic coding strips 16 are attached to the back side of the credit card 10 could contain instructions for identifying the proper indicia to which the tabs 26 should be set. This identifying information could be read by a terminal device in which the card is placed in order to trigger a light or other indicator. If a light were operated, it could shine through the appropriate opening 24 and if the opening 24 was associated with tab 26 a confirmation would be provided that the credit card owner is authentic and has authority to use the card.

Another arrangement provides that the signal from the magnetic strip 16 would be directed to a central computer and information storage center. The computer could verify the credit card number as well as the authenticity of the user by the setting of tabs 26.

Tabs 26 of appropriate construction may be rotated to an appropriate position and thus provide an input signal that will identify the credit card user. Thus, the tab 26 can be translated laterally in the slot 18 or rotated in that slot to provide a proper combination of movement and positioning of the tab 26 relative to the slot 18, thereby identifying the credit card user as the true owner of the credit card.

In the event the card is stolen or misplaced and used by an unauthorized person, that person would not know the correct combination and positioning of the tabs 26 relative to various indicia 22. The misuse of the card would be immediately sensed by appropriate card readers. Delay associated with dissemination of stolen credit card information to various businesses would be avoided.

Additionally, by the improved credit card construction of the present invention, a complex combination of multiple indicia need not be committed to memory by the credit card user. All that need to be recalled is a single indicia or a small number of indicia. Thus, it will be possible to utilize the total credit card number and card system developed and now used by many business without seriously altering that system. The improvement of the invention merely adds a safeguard system to prevent unauthorized use of the credit card.

Note also that the handle member 32 will project slightly above the surface of the credit card 10. The handle member 32 will thus serve as an additional record on the credit card receipt of the position of the tab 26 inasmuch as the credit card number 12, name 14 and other embossed information thereon will be embossed upon the customer's receipt along with an embossment from the use and position of the tab 26 and, in particular, the handle member 32 thereof. This will provide an additional check of the proper utilization of the indicia of the credit card and will disclose upon return thereof to the main office of the billing company that the sensing devices associated with the credit card construction of the present invention are operating properly or, alternatively, that the credit card is being misused by employees or businesses who accept the credit card.

Therefore, while in the foregoing there has been presented a preferred embodiment of the present invention, it is to be understood that the invention shall be limited only by the following claims and their equivalent constructions.

What is claimed is:

1. In a credit card construction of the type including lines of visible embossed numbers and information on the front panel and at least one strip of magnetic tape affixed to said card, said tape having information coded therein uniquely associated with the visible embossed information on said card, the improvement comprising a settable index mechanism in said card comprising a series of linearly arranged, serially ordered equispaced index positions defined along a slot in said card, at least one index member affixed in said slot and slidable therein to any one of said index positions, said index member being sized to correspond to only a single index position at any one time, said index member including a surface covered at least partially by magnetic tape material on the same side of the card as said strip of magnetic tape, said index member thereby providing additional identification information only when the index member is positioned in a certain one of the positions whereby the user of said card upon being advised of an appropriate index position associated with the proper use of said card can place said index member in said position whenever said card is to be properly used and can remove said index member from the defined proper position during periods of non use in order to frustrate confiscation and misuse of said credit card.

2. The improved credit card construction of claim 1 wherein magnetic tape includes coded information thereon indicating the certain one index position for said settable index member whereby the credit card provides self-contained information for verification that the index member is properly positioned in the certain one position.

3. The improved credit card construction of claim 1 wherein said single slot includes a plurality of index members for setting a multiple index combination of positions relative to index positions of said slot.

4. The improved credit card construction of claim 1 wherein said credit card includes a plurality of slots, each slot including at least one separate index member.

5. The improved credit card construction of claim 1 wherein said credit card construction includes a plurality of slots, each of said slots including a plurality of index members for setting a multiple index combination in each of said slots.

6. The improved credit card construction of claim 1 wherein said index member includes a planar surface for said magnetic tape, said tape covering only a portion of said surface, said index member being slidably positioned in said slot at one of the indexed positions and also rotatable in said slot at said index position, said additional identification information being provided by positioning said member in the certain one of said positions and rotating said member to a certain orientation.

7. The improved credit card construction of claim 1 wherein said index member comprises a link extending through said slot and terminating on opposite sides of the slot with flanges which maintain the member in the slot, one of the flanges having the magnetic tape affixed thereto and the other flange including a handle portion for manual positioning of the index member.

8. The improved credit card of claim 7 including detent means cooperative with the slot to retain the index member in a fixed position in the slot.

* * * * *